(12) United States Patent
Andral et al.

(10) Patent No.: US 11,820,520 B2
(45) Date of Patent: Nov. 21, 2023

(54) ROTORCRAFT PROVIDED WITH A YAW MOTION CONTROL SYSTEM HAVING A DUCTED ROTOR AND AN ICE PROTECTION SYSTEM

(71) Applicant: AIRBUS HELICOPTERS, Marignane (FR)

(72) Inventors: Sebastien Andral, Les Milles (FR); Christophe Serr, Simiane-Collongue (FR)

(73) Assignee: AIRBUS HELICOPTERS, Marignane (FR)

( * ) Notice: Subject to any disclaimer, the term of this patent is extended or adjusted under 35 U.S.C. 154(b) by 0 days.

(21) Appl. No.: 17/695,287

(22) Filed: Mar. 15, 2022

(65) Prior Publication Data

US 2022/0348336 A1 Nov. 3, 2022

(30) Foreign Application Priority Data

Apr. 28, 2021 (FR) ...................... 2104434

(51) Int. Cl.
  *B64D 15/00* (2006.01)
  *B64C 27/04* (2006.01)
  *B64C 27/82* (2006.01)

(52) U.S. Cl.
  CPC .............. *B64D 15/00* (2013.01); *B64C 27/04* (2013.01); *B64C 27/82* (2013.01); *B64C 2027/8254* (2013.01)

(58) Field of Classification Search
  CPC ........ B64C 27/8254; B64C 2027/8254; B64C 27/04; B64D 2033/0233; B64D 15/00
  See application file for complete search history.

(56) References Cited

U.S. PATENT DOCUMENTS

| 5,542,818 A | 8/1996 | Monvaillier et al. |
| 2011/0319008 A1 | 12/2011 | Ameyugo |

(Continued)

FOREIGN PATENT DOCUMENTS

| CN | 112373676 A | 2/2021 |
| DE | 3317854 A1 | 11/1983 |

(Continued)

OTHER PUBLICATIONS

French Search Report for French Application No. FR2104434, Completed by the French Patent Office, dated Nov. 24, 2021, 17 pages.

*Primary Examiner* — Tye William Abell
(74) *Attorney, Agent, or Firm* — BROOKS KUSHMAN P.C.

(57) ABSTRACT

A rotorcraft provided with a yaw motion control system comprising a fairing and a rotor provided with blades, the blades being arranged in the fairing and able to rotate about an axis of rotation of the rotor, the fairing comprising a casing defining an air stream, the air stream extending in a direction of flow of the air within the fairing from an intake section towards an outlet section. The rotorcraft comprises an ice protection system comprising at least one grille arranged upstream of the air stream in the air flow direction, the grille facing the intake section parallel to the axis of rotation and the casing, no grille facing at least one unprotected section of the intake section in a direction parallel to the axis of rotation.

20 Claims, 5 Drawing Sheets

(56) References Cited

U.S. PATENT DOCUMENTS

| | | | | |
|---|---|---|---|---|
| 2012/0305699 A1* | 12/2012 | Cole | ........................ | B64C 27/82 |
| | | | | 244/17.11 |
| 2015/0307182 A1* | 10/2015 | Mores | ...................... | B64C 27/82 |
| | | | | 244/17.13 |
| 2017/0145919 A1* | 5/2017 | Aubert | .................... | B64C 27/06 |
| 2018/0244368 A1* | 8/2018 | Vogl | ........................ | B64C 27/78 |
| 2018/0346135 A1 | 12/2018 | Haldeman et al. | | |
| 2020/0122825 A1 | 4/2020 | Bottasso et al. | | |

FOREIGN PATENT DOCUMENTS

| | | | | |
|---|---|---|---|---|
| EP | 2878536 A1 * | 6/2015 | ............. | B64C 27/82 |
| EP | 3136007 A1 | 3/2017 | | |
| FR | 1531536 A | 7/1968 | | |
| FR | 2719554 A1 | 11/1995 | | |
| FR | 2961789 A1 | 12/2011 | | |
| GB | 626571 A | 7/1949 | | |

\* cited by examiner

ROTORCRAFT PROVIDED WITH A YAW MOTION CONTROL SYSTEM HAVING A DUCTED ROTOR AND AN ICE PROTECTION SYSTEM

CROSS REFERENCE TO RELATED APPLICATIONS

This application claims priority to French patent application No. FR 21 04434 filed on Apr. 28, 2021, the disclosure of which is incorporated in its entirety by reference herein.

TECHNICAL FIELD

The present disclosure relates to a rotorcraft provided with a yaw motion control system having a ducted rotor and an ice protection system. The disclosure thus belongs to the technical field of de-icing ducted yaw motion control rotors of rotorcraft.

BACKGROUND

A rotorcraft is usually provided with at least one rotor, which is sometimes referred to as the "main rotor", forming a rotary wing.

The main rotor may be driven by a gearbox that is set in motion by at least one engine. While it rotates, the main rotor applies torque to an airframe of the rotorcraft. Consequently, a rotorcraft provided with a single main rotor is usually provided with a device for controlling its yaw motion.

Such a device may include a yaw motion control system arranged at the rear of the rotorcraft. This yaw motion control system applies thrust having at least one transverse component in order to control the yaw motion of the rotorcraft. Consequently, this yaw motion control system may comprise a rotor and may sometimes be referred to as a "rear rotor" as a result of its positioning, or alternatively as an "anti-torque rotor" owing to its ability to counteract the torque generated by the main rotor on the airframe.

The yaw motion control system may include a ducted rotor. A ducted yaw motion control system includes a fairing. This fairing is a constituent part of a large vertical stabilizer. The ducted yaw motion control system also comprises a small rotor arranged in this fairing. This rotor is provided with a hub carrying blades arranged in the fairing. In particular, the fairing may comprise a convergent section extended by a blade path and then by a divergent section. The thrust generated by the blades is relatively low, in the region of half the thrust generated by an unducted rear rotor. However, the fairing also generates thrust in the region of half the thrust generated by an unducted rear rotor. Consequently, the fairing and the blades of a ducted yaw motion control rotor together generate sufficient total thrust to control the yaw motion of the rotorcraft.

Documents FR 2 719 554 and FR 1 531 536 describe ducted yaw motion control rotors.

According to another aspect, a rotorcraft provided with a yaw motion control system with a ducted rotor may sometimes operate in icing conditions. During a flight in icing conditions, ice may be deposited on the fairing, particularly at the convergent section and in the blade path. This ice is formed by supercooled water droplets in the air that hit the fairing when the rotorcraft is moving, and freeze on impact. The ice tends to impair the performance of the yaw motion control system.

Devices may be arranged to prevent the formation of ice on Pitot tubes, or indeed on a windshield, engine air intakes, or blades of a yaw motion control rotor. Systems are sometimes used on an empennage.

A rotorcraft may comprise electrothermal de-icing devices arranged within the blades of the main rotor. These devices are used on an ad hoc basis to remove ice that has already formed, and not to prevent ice from forming. Indeed, these devices require a relatively high amount of electrical energy that does not allow them to be used continuously for the purpose of preventing ice from forming.

The prior art also includes devices for protecting the whole of an engine air intake, in particular to prevent birds or debris from being sucked in. However, these grilles may comprise means for dislodging any ice so as not to impede the entry of air into the engine in icing conditions. Patent FR 2 961 789 describes a method for preventing an engine air intake grille from becoming clogged.

Document EP 3 136 007 A1 describes a de-icing/anti-icing system causing a grille to vibrate.

Document GB 626 571 describes a system for circulating heated lubricating oil through tubular elements of a grille arranged in a gas turbine.

The following documents are far removed from the problem of the disclosure. Thus, document DE 33 17 854 A1 discloses an unducted rotor protected from branches by a grille. Document CN 112 373 676 A describes a ducted rotor provided with tiltable flaps.

Documents US 2020/122825 and US 2018/346135 A1 are also known.

SUMMARY

An object of the present disclosure is therefore to propose a rotorcraft comprising an alternative yaw motion control rotor intended to optimize its performance in icing conditions.

The disclosure relates to a rotorcraft provided with a yaw motion control system with a ducted rotor, said system comprising a fairing and a rotor provided with blades, the blades being arranged in the fairing and able to rotate about an axis of rotation of the rotor, said fairing comprising a casing defining an air stream around the axis of rotation, said air stream extending in a direction of flow of the air within the fairing from an intake section towards an outlet section.

The expression "direction of flow" refers to a direction in which air passes through the rotor. This air may possibly pass through the rotor in two different directions, depending on the flight scenario. The grille or grilles are positioned upstream of the rotor in one of these directions referred to as the "direction of flow of the air". In this case, the direction of flow may be the direction in which the air passes through the rotor when the aircraft is in hovering flight.

The rotorcraft comprises an ice protection system for said yaw motion control system, said ice protection system comprising at least one grille arranged upstream of the air stream in said air flow direction, said grille facing said intake section and the casing parallel to the axis of rotation, no grille facing at least one unprotected section of the intake section in a direction parallel to the axis of rotation.

The ice protection system may only partially cover the intake section in a direction parallel to the axis of rotation. Thus, an unprotected section does not face the ice protection system in a direction parallel to the axis of rotation.

The expression "facing said intake section and the casing parallel to the axis of rotation" means that a plurality of straight lines parallel to the axis of rotation pass through a grille and the intake section. An orthogonal projection of the grille in a plane containing the intake section is therefore at least partially superposed with a part of the intake section. In this plane, the orthogonal projection of the grille or grilles, as the case may be, in a plane containing the intake section, partially covers the intake section. From the perspective of an individual looking at the system in the direction of flow of the air, the grille or grilles are in particular in front of portions of the intake section. However, there is no grille facing the unprotected section and, therefore, the orthogonal projection of the grille or grilles, as the case may be, and the ice protection system, in a plane containing the intake section, is different from the unprotected section, i.e., it does not cover the unprotected section. The grille or grilles can thus extend outside the air stream.

The expression "parallel to the axis of rotation" refers to at least one direction parallel to the axis of rotation.

Therefore, as the rotorcraft moves forward, air strikes the grille or grilles. In icing conditions, the grille or grilles are hit by supercooled water droplets present in the air. Ice forms, clogging the grille or grilles. Because of the positioning of this or these grilles, the grille or grilles then tend to protect the casing and prevent ice from being deposited on the casing around the air stream.

However, at least one section referred to as the "unprotected section" is not covered by a grille. As a result, the rotor of the yaw motion control system can always generate a flow of air in the air stream.

This ice protection system runs counter to the prejudices expressed in the field of engine air intakes by instead favouring the accumulation of ice on the grille or grilles, in order to protect the casing surrounding the air stream against icing.

Moreover, this ice protection system constitutes a passive system that does not require electrical power, making it compatible with helicopters provided with ducted rotors. This ice protection system is also relatively lightweight and even relatively easy to install.

The rotorcraft may further comprise one or more of the following features, taken individually or in combination.

According to one possibility, said at least one grille may extend facing a periphery of said intake section parallel to the axis of rotation.

The intake section then includes a periphery surrounding a central zone. At least part of the central zone forms the unprotected section. For example, the central zone is in the form of a disk, possibly centered on the axis of rotation. The periphery optionally describes a ring, for example centered on the axis of rotation.

Consequently, the central zone of the intake section does not face or partially faces a grille, parallel to the axis of rotation, allowing the rotor to operate in good conditions.

According to one possibility compatible with the preceding possibility, said periphery being able to comprise, in a direction of forward travel of the rotorcraft, a rear section and a front section, a grille of said at least one grille at least partially faces the front section or the rear section parallel to the axis of rotation.

For example, the front section represents a half-ring and the rear section represents a half-ring. Therefore, the front section and the rear section together form a ring.

At least one grille is then opposite at least one of the front or rear sections in order to protect a portion of the casing surrounding the rotor.

Optionally, the rotorcraft comprises two said grilles, said two grilles comprising a front grille facing the front section and a rear grille facing the rear section.

Therefore, the entire periphery can be protected by grilles.

Optionally, the front grille and the rear grille may be different and/or may form a single grille.

Indeed, it is possible to optimize the grilles.

For example, the front grille may extend transversely parallel to the axis of rotation over a first distance, and the rear grille may extend transversely parallel to the axis of rotation over a second distance, the second distance being smaller than the first distance.

The front grille, which is the first to be hit by the air coming from the front of the aircraft, may therefore be larger than the rear grille.

According to one possibility compatible with the preceding possibilities, said at least one grille is domed, with a concave face turned towards the air stream.

Such a shape can promote the collection of ice and the protection of the casing.

If several grilles are present, several or indeed each grille may have this shape, which is domed towards the front.

According to one possibility compatible with the preceding possibilities, said at least one grille may be carried by a frame fastened to the fairing.

The frame may be relatively lightweight in order to minimize the weight of the ice protection system.

The frame may not be facing said at least one unprotected section of the intake section in a direction parallel to the axis of rotation.

According to one possibility compatible with the preceding possibilities, said at least one grille may be arranged frontally facing an air flow running along said rotorcraft and arriving from a front zone of the rotorcraft.

The grille or grilles are transversely offset with respect to the stream, i.e., relative to the axis of rotation of the rotor, and are thus positioned in the flow of air coming from the front of the rotorcraft. During forward flight, the grille or grilles may then be covered with ice.

Moreover, the casing may comprise a rear sector followed by a front sector along an axis of forward travel of the rotorcraft, the rear sector and the front sector being arranged to either side of a plane that contains the axis of rotation of the rotor and is parallel to a yaw axis of the rotorcraft, said at least one grille then being arranged, for example, at least partially upstream of the rear sector in a direction leading from a front zone to a rear end of the rotorcraft.

In other words, the air arriving from the front zone hits the grille before possibly reaching the rear sector.

According to one possibility compatible with the preceding possibilities, said at least one grille extends in a curved line, for example over an arc of a circle, which may or may not be centered on the axis of rotation.

The grille or grilles may have this shape in order to locally cover an annular periphery.

According to one possibility compatible with the preceding possibilities, said at least one grille may extend over an arc of a circle, which may or may not be centered on the axis of rotation, or even over a semicircle.

According to another possibility, said intake section may comprise, in a direction of forward travel of the rotorcraft, a first section extended by a second section from a hub of the rotor, said at least one grille facing the first section parallel to the axis of rotation.

For example, the first section and the second section are symmetrical with respect to a plane passing through the axis of rotation of this rotor and substantially orthogonal to an anteroposterior axis of the rotorcraft.

As a result, substantially the rear half of the intake section is covered by a grille.

According to one possibility compatible with the preceding possibilities, said casing being able to comprise a convergent section extended by a blade path surrounding said blades, said at least one grille may be arranged, in a direction oriented parallel to the axis of rotation, upstream of at least part of the convergent section, or indeed at least part of the blade path.

The grille may be outside the air stream and, in particular, outside the convergent section.

Parts of the casing that are usually likely to accumulate ice are thus protected by a grille.

In addition to a rotorcraft, the disclosure relates to an ice protection method for a yaw motion control system with a ducted rotor of a rotorcraft, said system comprising a fairing and a rotor provided with rotor blades, the blades being arranged in the fairing and able to rotate about an axis of rotation of the rotor, said fairing comprising a casing defining an air stream around the axis of rotation, said air stream extending in a direction of flow of the air within the fairing from an intake section towards an outlet section, said casing comprising an inner face surrounding the rotor.

This method comprises the arrangement of at least one grille arranged upstream of the air stream in the air flow direction, said grille facing said intake section and the casing, no grille facing at least one unprotected section of the intake section in a direction parallel to the axis of rotation.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Three directions X, Y, and Z orthogonal to each other are shown in the figures.

Direction X is referred to as the longitudinal direction and another direction Y is referred to as the transverse direction. Finally, a third direction Z is referred to as the elevation direction and corresponds to the height dimensions of the structures described.

Figure 1:
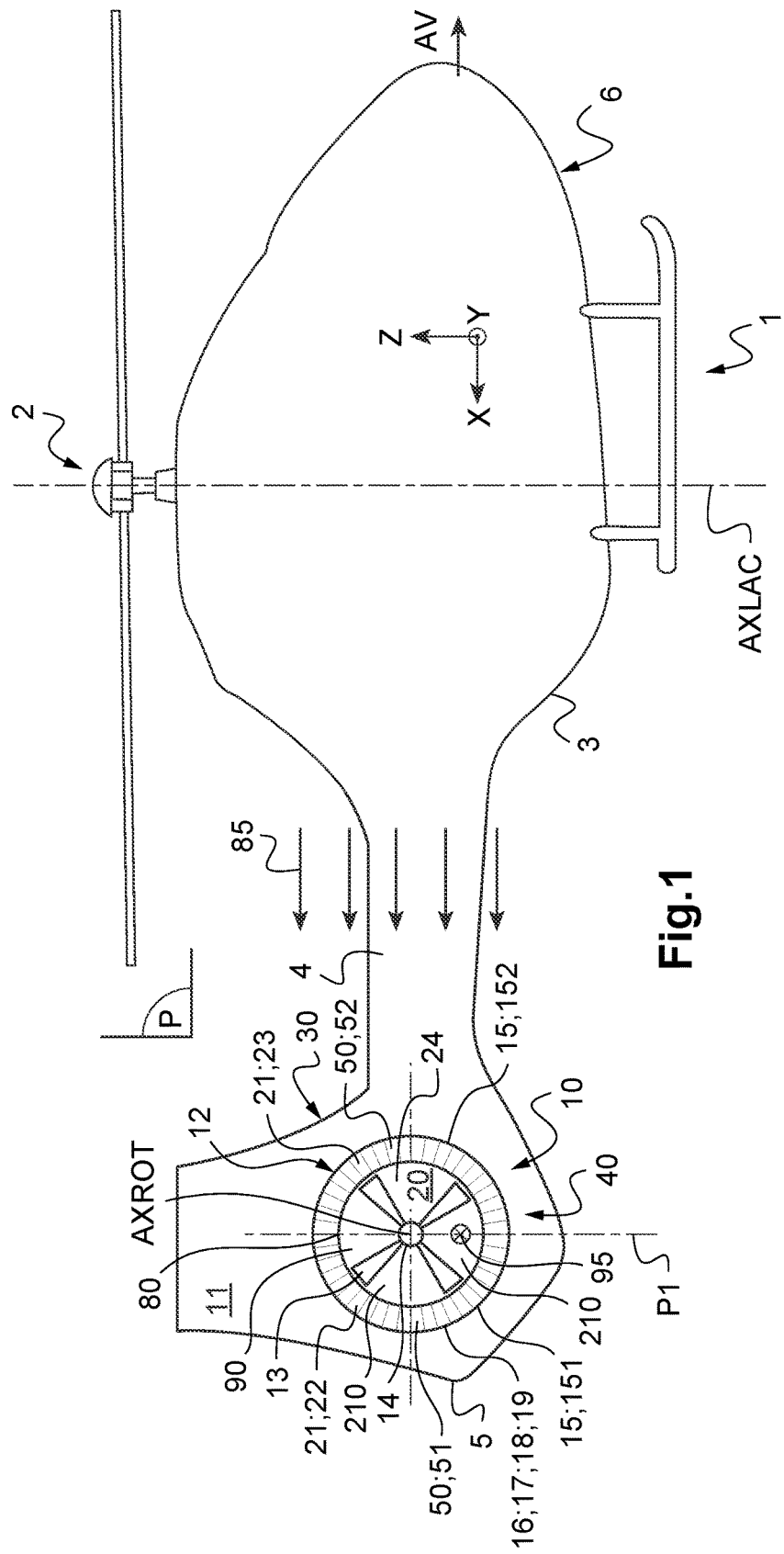
FIG. 1 is a schematic view of a rotorcraft according to the disclosure.

FIG. 1 shows a rotorcraft 1 according to the disclosure provided with a yaw motion control system 10, and with a rotary wing 2.

The rotorcraft 1 may comprise an airframe that extends longitudinally along an anteroposterior plane P from a rear end 5 to a front zone 6. In particular, the airframe may comprise a main section 3 provided with the front zone 6 and surmounted by the rotary wing 2. This main section 3 may be extended by a tail boom 4 carrying the yaw motion control system 10 forming the rear end 5.

Moreover, the rotorcraft 1 moves forwards in a direction of forward travel AV leading from the rear end 5 towards the front zone 6.

Irrespective of the shape of the rotorcraft 1, the yaw motion control system 10 comprises a fairing 11 carried, where appropriate, by the tail boom 4. The yaw motion control system 10 also comprises a rotor 12 in the fairing 11. In particular, the rotor 12 has a plurality of blades 13 carried by a hub 14. The blades 13 together rotate about an axis of rotation AXROT.

As is conventional, the rotorcraft 1 may comprise a power plant, which is not shown here, for moving the rotary wing 2 and/or the rotor 12.

More precisely, the fairing 11 comprises a cowling forming a casing 15 that delimits an air stream 90. The air stream 90 and the casing 15 that delimits it extend transversely along the axis of rotation AXROT. The casing 15 may be rotationally symmetrical with respect to the axis of rotation AXROT. In particular, air flows in the air stream 90, in a direction 95 of flow of the air within the fairing 11, from an intake section 20 towards an outlet section 30. The casing 15 may possibly comprise, transversely and successively, a convergent section 16, a blade path 17 that is, for example, cylindrical, then a divergent section 18. The term "convergent section" refers to a part of the casing 15 which narrows in the air flow direction 95, whereas the term "divergent section" refers, on the contrary, to a part of the casing 15 which widens in the air flow direction 95. The casing 15 may additionally comprise, longitudinally, a rear sector 151 followed by a front sector 152 along an axis of forward travel AV of the rotorcraft 1, the rear sector 151 and the front sector 152 being arranged to either side of a plane P1 that contains the axis of rotation AXROT and is parallel to a yaw axis AXLAC.

Therefore, the intake section 20 is defined by the convergent section 16 and the outlet section 30 is defined by the divergent section 18. The blades 13 are arranged in the air stream 90 and, for example, in the blade path 17, the hub 14 being carried by a support connected to the casing 15 in a conventional manner, by arms. Reference can be made, if necessary, to the literature that describes such a system 10.

The intake section 20 may comprise a periphery 21 surrounding a central zone 210. In the direction of forward travel AV of the rotorcraft 1, the periphery 21 comprises a rear section 22 and a front section 23 arranged around the central zone 210. For example, the rear section 22 and the front section 23 are symmetrical relative to the plane P1 of symmetry of the casing 15 and/or each extends over a semicircle.

In an innovative manner, the rotorcraft 1 includes an ice protection system 40 in order to optimize the operation of the yaw motion control system 10 in icing conditions.

This ice protection system 40 comprises one or more grilles 50. Reference number "50" is used to refer to any grille, reference numbers "51, 52" being used to refer to specific grilles. The term "each" is used hereinafter irrespective of the number of grilles, i.e., in the presence of one or more grilles 50. Each grille comprises a mesh forming openings. For example, each grille may include wires made from metal or the like, a perforated metal sheet, etc.

Each grille 50 is arranged upstream of the air stream 90 in the air flow direction 95. In other words, an individual looking at a grille 50 in a direction parallel to the axis of rotation AXROT would note that the grille 50 is located in front of a part of the intake section 20. Each grille 50 therefore faces at least the intake section 20 parallel to the axis of rotation AXROT.

Furthermore, at least one unprotected section 24 of the intake section 20 is not facing a grille 50, or indeed another member of the ice protection system 40, such as a frame carrying a grille, for example. Air flowing in the air flow direction 95 can thus reach the unprotected section 24 without passing through the grille 50. If the grille or grilles 50 are clogged with ice, air can still continue to flow in the air stream 90.

Thus, according to the method applied, at least one grille 50 is arranged upstream of the air stream 90 in the air flow direction 95, by arranging it in line with the intake section 20 and the casing 15 parallel to the axis of rotation AXROT.

Each grille 50 may optionally be arranged, parallel to the axis of rotation AXROT, upstream of at least a part of the convergent section 16, or of at least a part of the blade path 17, or of the divergent section 18. Optionally, the entire casing 15 may be protected from ice by one or more grilles 50. A grille 50 may in particular be arranged upstream of the rear sector 151 of the casing 15 with respect to a direction opposite the direction of forward travel AV, in order to protect it.

On a conventional ducted helicopter, in icing conditions, the air 85 arriving from the front zone 6 of the moving rotorcraft hits the casing 15. This air 85 may be loaded with supercooled water droplets, and may cause ice to form on this casing 15.

According to the disclosure, in icing conditions, each grille 50 is hit by supercooled water droplets that may be present in the air 85. The supercooled water droplets freeze on impact on each grille 50. The ice formed in this way quickly clogs the grille or grilles 50. As a result, each clogged grille 50 then prevents supercooled water droplets present in the air from reaching the zones of the casing 15 which it protects. In particular, each grille 50 can limit the accumulation of ice on the convergent section 16, the blade path and the divergent section 18, as the case may be, in particular at the rear sector 151. Each grille 50 thus makes it possible at least to limit the risk of ice forming on the casing 15 delimiting the air stream 90. The casing 15 can therefore always help effectively control yaw motion.

FIGS. 2 to 10 show various ice protection systems 40.

Figure 2:
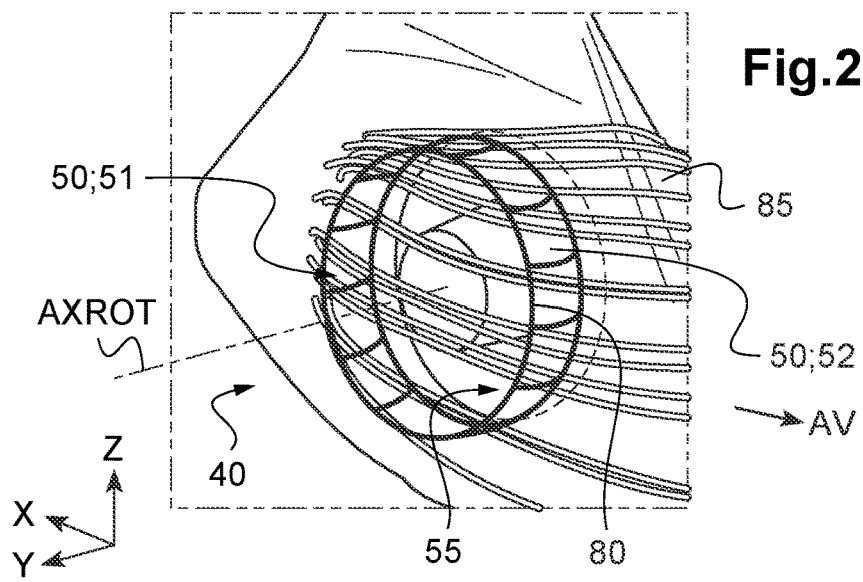
FIG. 2 is a three-dimensional view showing an ice protection system.

With reference to FIG. 2 and regardless of the embodiment of the ice protection system 40, each grille 50 may be fastened to a frame 80, this frame 80 itself being fastened to the fairing 11.

According to another optional feature and regardless of the embodiment of the ice protection system 40, each grille may be arranged frontally facing the air flow 85 running along the rotorcraft 1 and arriving from the front zone 6. This arrangement makes it possible to collect supercooled water droplets before they hit the casing 15.

Figure 3:
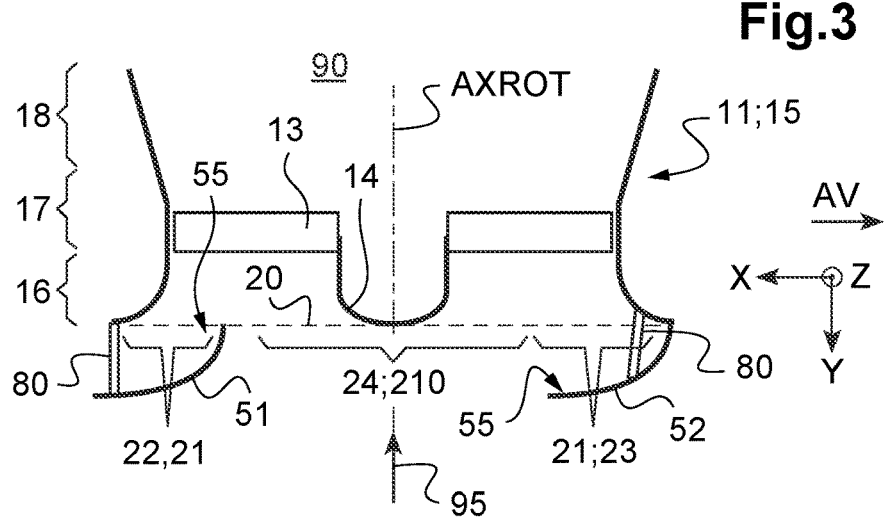
FIG. 3 is a schematic cross-section of an ice protection system according to FIG. 2.

According to another optional feature, regardless of the embodiment of the ice protection system 40 and as shown in FIG. 3, for example, each grille 50 may be domed, with a concave face 55 turned towards the air stream 90. Each grille 50 is thus domed towards the front zone 6 in order to optimize ice collection.

According to another optional feature, regardless of the embodiment of the ice protection system 40 and as shown in FIG. 3, for example, each grille 50 extends facing a periphery of said intake section 20 parallel to the axis of rotation AXROT. Such positioning helps protect the casing 15 of the fairing 11 surrounding the air stream 90.

In particular, each grille 50 may at least partially cover the front section 23 or the rear section 22 of the periphery 21 of the intake section 20.

Figure 4:
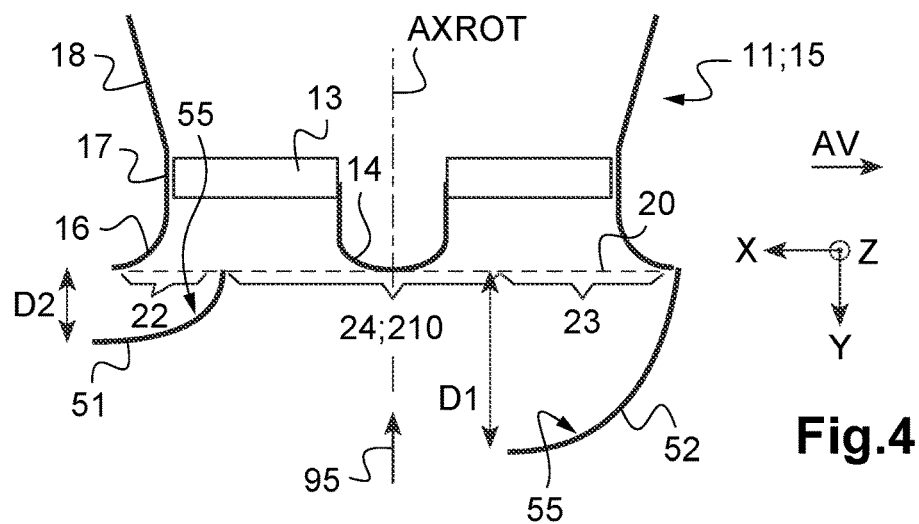
FIG. 4 is a cross-section of an ice protection system having two different grilles.

According to FIGS. 2 to 4, the ice protection system 40 may comprise two grilles 51, 52 in order to possibly protect the entire casing 15. The unprotected section 24 then comprises the central zone 210.

The two grilles 51, 52 may comprise a front grille 52 facing the front section 23 and a rear grille 51 facing the rear section 22 of the periphery 21 parallel to the axis of rotation AXROT.

According to FIG. 3, the front 52 and rear 51 grilles are different but may extend transversely the same distance away from the intake section 20.

According to FIG. 4, the front grille 52 extends transversely parallel to the axis of rotation AXROT over a first distance D1 and the rear grille 51 extends transversely parallel to the axis of rotation AXROT over a second distance D2. However, the second distance D2 is smaller than the first distance D1 in order to promote ice collection.

Figure 5:
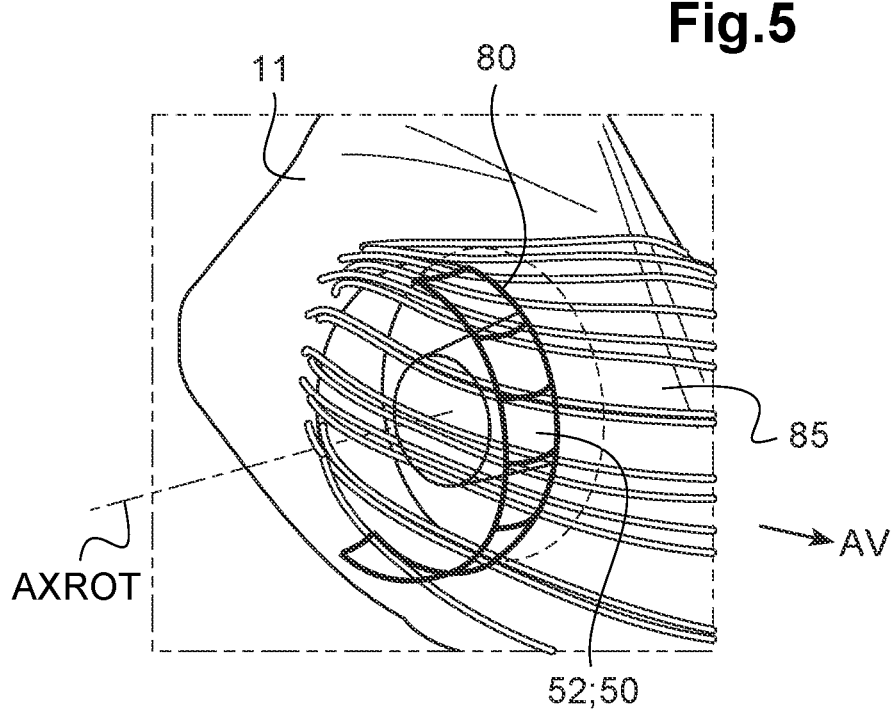
FIG. 5 is a three-dimensional view showing an ice protection system.
Figure 6:
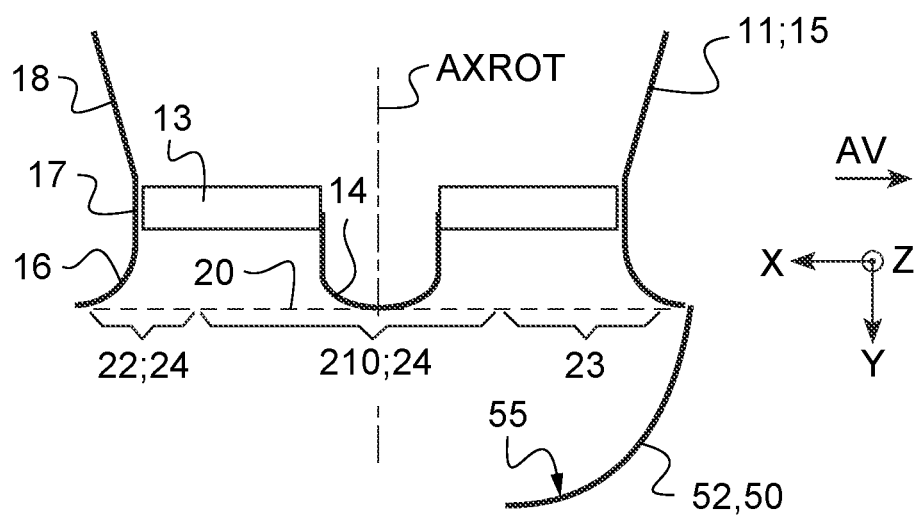
FIG. 6 is a schematic cross-section of the ice protection system according to FIG. 5.

According to FIGS. 5 and 6, the ice protection system 40 may comprise a single front grille 52 arranged facing the front section 23 of the periphery 21 and the front sector 152 of the casing 15. The unprotected section 24 then comprises the central zone 210 and the rear section 22. Optionally, the front grille 52 may cover part of the central zone 210. The front grille 52 allows supercooled water particles to be collected from the air 85 before the intake section 20.

Figure 7:
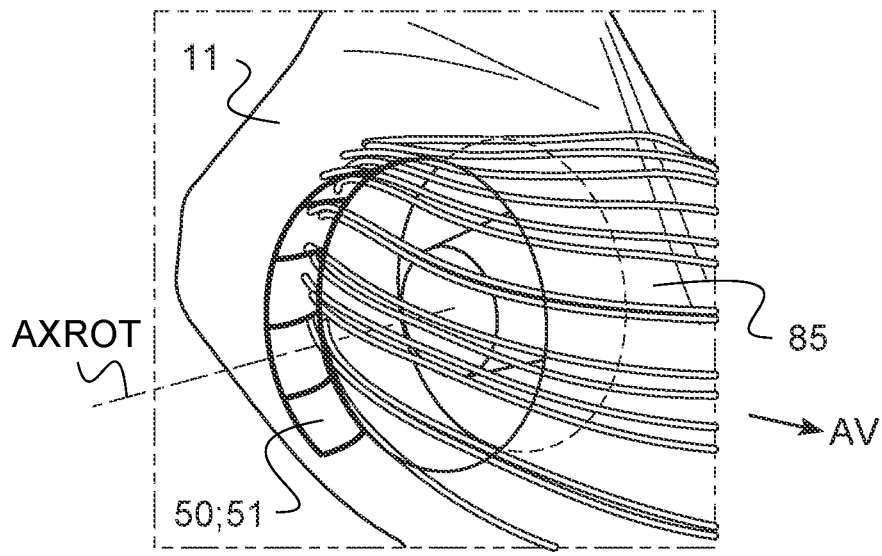
FIG. 7 is a three-dimensional view showing an ice protection system.
Figure 8:
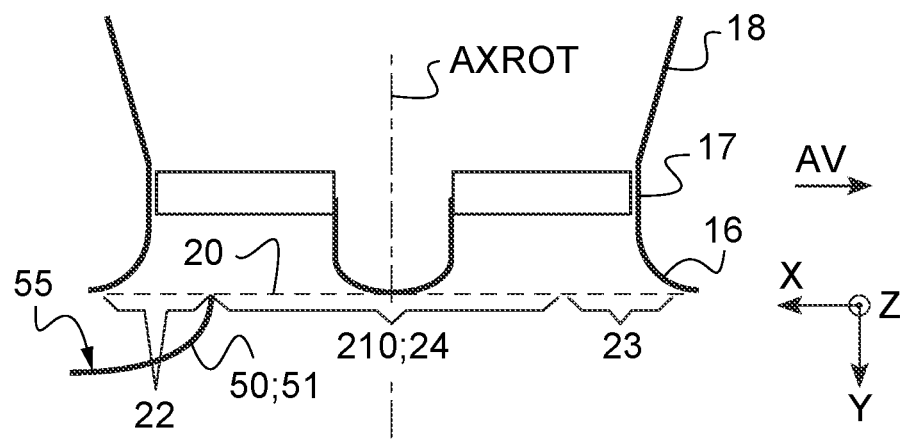
FIG. 8 is a schematic cross-section of an ice protection system according to FIG. 7.

According to FIGS. 7 and 8, the ice protection system 40 may comprise a single rear grille 51 arranged facing the rear section 22 of the periphery 21. The unprotected section 24 then comprises the central zone 210 and the front section 23.

Indeed, the supercooled water droplets in the air 85 may be deposited mainly on the rear sector 151 of the casing 15, due to of the movement of the rotorcraft 1. It is therefore possible to envisage positioning a grille 50 only at the rear section 22.

According to FIGS. 1 to 8, each grille 51, 52 extends in a curved line and, for example, over an arc of a circle that may be centered on the axis of rotation AXROT, and in particular over a semicircle. According to embodiments that are not shown here, each grille 50 may extend over an arc of a circle covering an angular sector of less than 180° in order to partially cover the rear section 22 or the front section 23 of the periphery 21.

Figure 9:
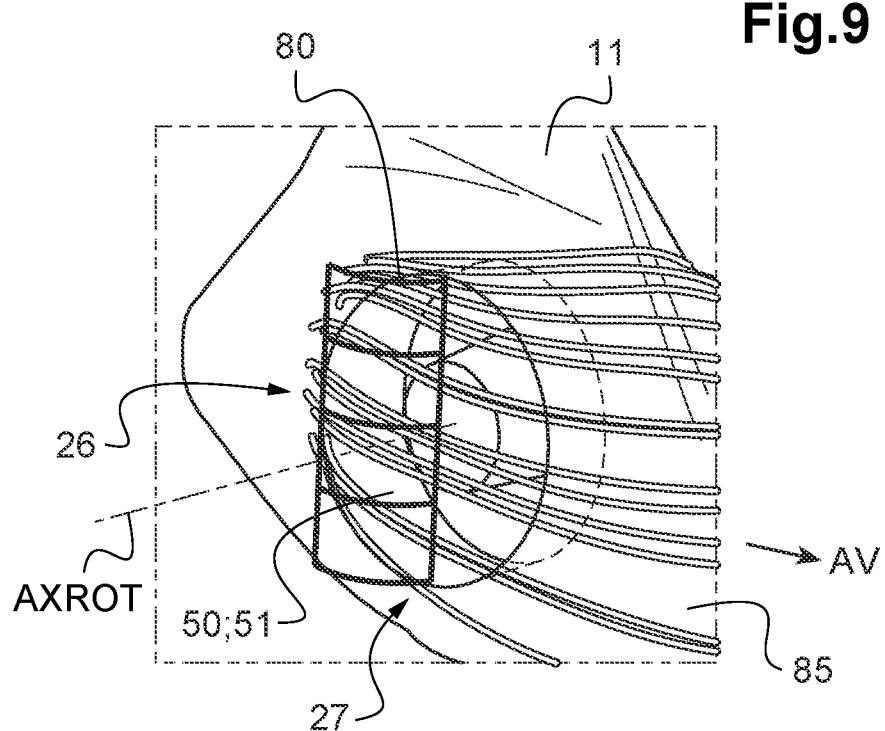
FIG. 9 is a three-dimensional view showing an ice protection system.
Figure 10:
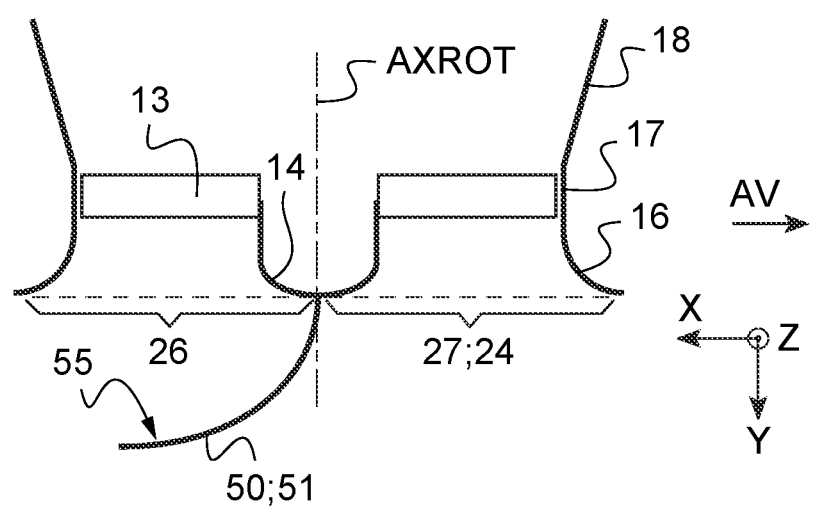
FIG. 10 is a schematic cross-section of an ice protection system according to FIG. 9.

According to FIGS. 9 and 10, the intake section 20 comprises, in the forward direction, a first section 26 that is extended by a second section 27 from a hub 14 of the rotor 12, a rear grille 51 then covering the first section 26.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure.

What is claimed is:

1. A rotorcraft provided with a yaw motion control system with a ducted rotor, the yaw motion control system comprising a fairing and a rotor provided with blades, the blades being arranged in the fairing and able to rotate about an axis of rotation of the rotor, the fairing comprising a casing defining an air stream around the axis of rotation, the air stream extending in a direction of flow of the air within the fairing from an intake section towards an outlet section, wherein the rotorcraft comprises an ice protection system for the yaw motion control system, the ice protection system comprising at least one grille arranged upstream of the air stream in the air flow direction, the grille over the intake section and the casing parallel to the axis of rotation, no grille over at least one unprotected section of the intake section in a direction parallel to the axis of rotation, wherein the ice protection system partially covers the intake section in a direction parallel to the axis of rotation.

2. The rotorcraft according to claim 1,
wherein the at least one grille is domed, with a concave face turned towards the air stream.

3. The rotorcraft according to claim 1,
wherein the at least one grille is attached to a frame fastened to the fairing.

4. The rotorcraft according to claim 1,
wherein the at least one grille is arranged frontally over an air flow running along the rotorcraft and arriving from a front zone of the rotorcraft.

5. The rotorcraft according to claim 1,
wherein, the casing comprising a rear sector and a front sector spaced along an axis of forward travel of the rotorcraft, the rear sector and the front sector being arranged to either side of a plane that contains the axis of rotation of the rotor and is parallel to a yaw axis, the at least one grille is arranged at least partially upstream of the rear sector in a direction leading from a front zone to a rear end of the rotorcraft.

6. The rotorcraft according to claim 1,
wherein the intake section comprises, in a direction of forward travel of the rotorcraft, a first section extended by a second section from a hub of the rotor, the at least one grille comprising a grille over the first section parallel to the axis of rotation.

7. The rotorcraft according to claim 1,
wherein, the casing comprising a convergent section extended by a blade path surrounding the blades, the at least one grille is arranged, parallel to the axis of rotation, upstream of at least part of the convergent section and at least part of the blade path.

8. The rotorcraft according to claim 1,
wherein the at least one grille extends in a curved line.

9. The rotorcraft according to claim 8,
wherein the at least one grille extends over an arc of a circle.

10. The rotorcraft according to claim 1,
wherein the at least one grille extends over a periphery of the intake section parallel to the axis of rotation.

11. The rotorcraft according to claim 10,
wherein, the periphery comprising, in a direction of forward travel of the rotorcraft, a rear section and a front section, a grille of the at least one grille at least partially extends over the front section or the rear section parallel to the axis of rotation.

12. The rotorcraft according to claim 11,
wherein the rotorcraft comprises two grilles of the at least one grille, the two grilles comprising a front grille over the front section and a rear grille over the rear section.

13. The rotorcraft according to claim 12,
wherein the front grille and the rear grille are different.

14. The rotorcraft according to claim 13,
wherein the front grille extends transversely parallel to the axis of rotation over a first distance, the rear grille extends transversely parallel to the axis of rotation over a second distance, the second distance being smaller than the first distance.

15. An ice protection method for a yaw motion control system with a ducted rotor of the rotorcraft, the yaw motion control system comprising a fairing and a rotor provided with blades, the blades being arranged in the fairing and able to rotate about an axis of rotation of the rotor, the fairing comprising a casing defining an air stream around the axis of rotation, the air stream extending in a direction of flow of the air within the fairing from an intake section towards an outlet section, wherein the method comprises the arrangement of at least one grille arranged upstream of the air stream in the air flow direction, the grille over the intake section and the casing, no grille over at least one unprotected section of the intake section in a direction parallel to the axis of rotation, wherein the ice protection system partially covers the intake section in a direction parallel to the axis of rotation.

16. The rotorcraft according to claim 15,
wherein the at least one grille covers a periphery of the intake section parallel to the axis of rotation.

17. The rotorcraft according to claim 16,
wherein, the periphery comprising a rear section and a front section, and the at least one grille at least partially covers the front section or the rear section parallel to the axis of rotation.

18. An ice protection method for a yaw motion control system with a ducted rotor of the rotorcraft, the yaw motion control system comprising a fairing and a rotor provided with blades, the blades arranged in the fairing for rotating about an axis of rotation of the rotor, the fairing comprising a casing for defining an air stream around the axis of rotation extendable in a direction of air flow within the fairing from an intake section towards an outlet section, wherein the rotorcraft comprises an ice protection system comprising at least one grille that partially covers the intake section in a direction parallel to the axis of rotation.

19. The rotorcraft according to claim 18,
wherein the at least one grille covers a periphery of the intake section parallel to the axis of rotation.

20. The rotorcraft according to claim 19,
wherein, the periphery comprising a rear section and a front section, and the at least one grille at least partially covers the front section or the rear section parallel to the axis of rotation.

* * * * *